D. E. COUTARET.
MANUFACTURE OF SULFURIC ACID.
No. 11,050. Patented June 13, 1854.
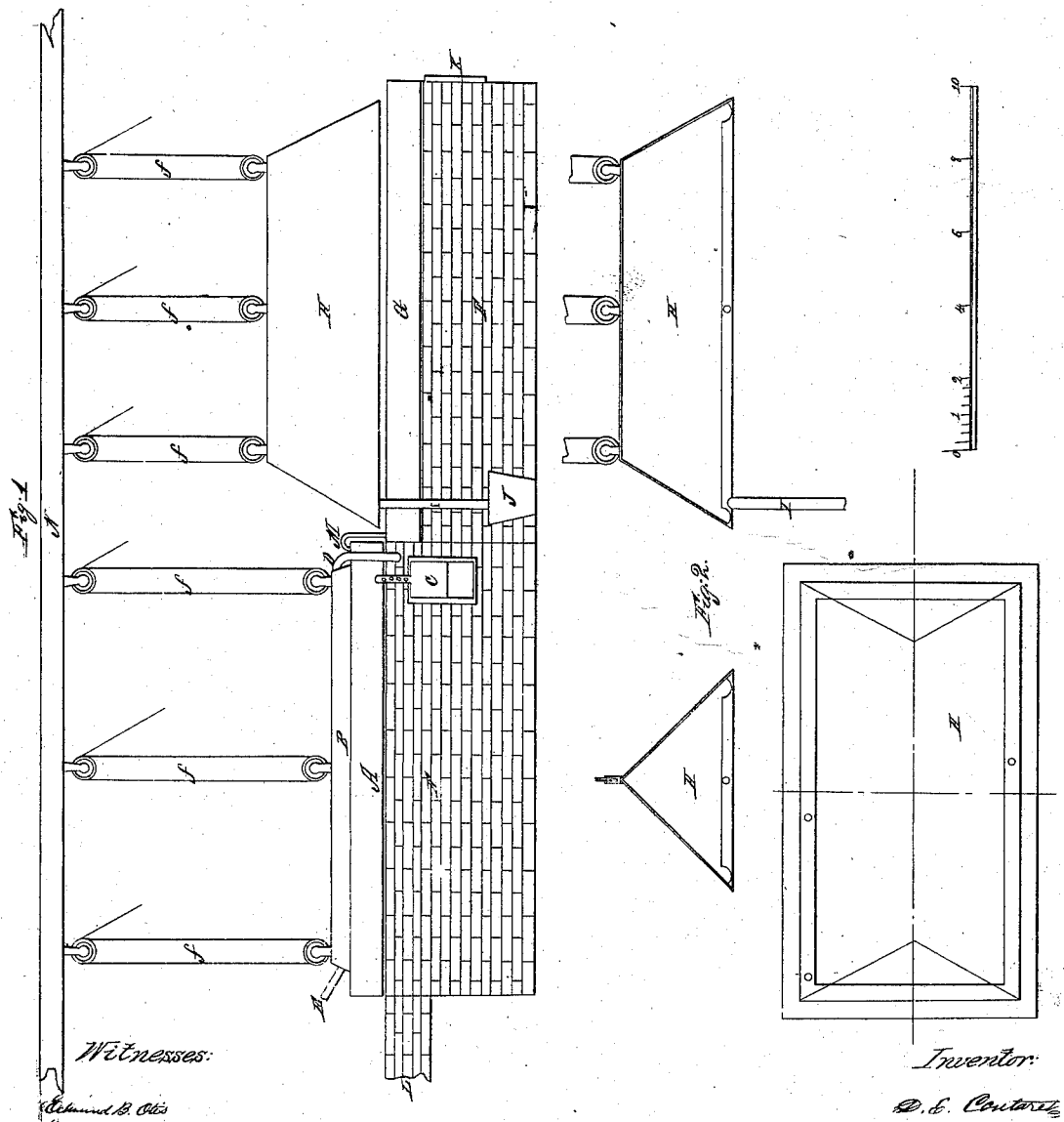

UNITED STATES PATENT OFFICE.

DOMINIQUE E. COUTARET, OF ROXBURY, MASSACHUSETTS.

MANUFACTURE OF SULFURIC ACID.

Specification of Letters Patent No. 11,050, dated June 13, 1854.

*To all whom it may concern:*

Be it known that I, DOMINIQUE EMILE COUTARET, now of Roxbury, in the county of Norfolk and Commonwealth of Massachusetts, have invented certain improvements in the mode of bleaching, purifying, and concentrating sulfuric acid from chambers of lead (parts of which invention are applicable to evaporating other liquids) without loss or noxious emanations; and I do hereby declare that the following is a full and exact description thereof, reference being had to the accompanying drawing and the explanation of the same given below.

The sulfuric acid, issuing from chambers of lead at 50° or 52° Baumé is usually colored yellow. This coloring is owing to the presence of hypoazotic acid (the formula of which is $AzO^4$—or what is the same thing, $NO^4$,) which is formed during the process of manufacturing, and which is disengaged in the form of orange-red vapors at the time when the sulfuric acid is heated to concentrate it in the leaden evaporating boilers used in all manufactories. The color of the nitrous gas $AzO^3$— and of the hyponitric gas $AzO^4$—is orange-red, but they communicate a yellow color to the liquid which holds them in solution.

Two important disadvantages result from this disengagement of hypoazotic acid in the atmosphere. First, an insupportable and suffocating smell dangerous to the workmen and the neighborhood; second, a perceptible loss of hypoazotic acid to the establishment. In order to avoid this double inconvenience and bleach the sulfuric acid, I cover the boiler A, which receives the sulfuric acid from the leaden chambers with the movable leaden cover B, the edges of which are submerged in the acid contained in the boiler A. I then cause to circulate over the surface of this acid, placed under the cover B, a current of sulfurous acid gas produced by the combustion of sulfur in a furnace C,—built in the masonry of the furnace F. This sulfurous acid gas is conducted under the cover B, by the communicating tube D, and takes away from the liquid sulfuric acid all the nitrous gas by combining with it by chemical reaction, forming with the nitrous gas (whose formula is $AzO^3$) liquid sulfuric acid again, which remains in the boiler. The chemical reaction is effected as follows: The gas $AzO^4$ yields one equivalent of oxygen to the gas $SO^2$, which is immediately converted into sulfuric acid $SO^3$—; there remains then the nitrous gas, whose formula is $AzO^3$, which escapes by the tube E, placed at the extremity of the cover B. (See the drawing.) I cause whatever surplus remains of these sulfurous and nitrous gases, which are not in the necessary proportion to unite chemically and form sulfuric acid, to pass into the pipe of the sulfur furnace of the chambers by the tube E placed at the extremity of the cover B, and to which may be given the necessary length. These sulfurous and nitrous gases, on reaching, by the tube E, the pipe of the large furnace which furnishes the products for the leaden chambers, are carried also to the chambers and find there all the necessary elements to transform them definitely into sulfuric acid. I obtain then by these means the purification and bleaching of the sulfuric acid; since the nitrous acid, which colors the liquid yellow, at the same time that it gives it an insupportable odor, and the pernicious property of acting on the leaden apparatus, is carried away from the surface of the liquid when heated under the cover B by its combination with the sulfurous acid gas produced continually from the furnace C. The sulfuric acid, thus bleached and purified, is afterward conducted from the boiler A, by means of the siphon M, into a second evaporating boiler of lead G, to be there concentrated; but there also another doubly injurious disadvantage presents itself. When the temperature of the sulfuric acid is raised to effect the concentration, the steam which is formed carries with it a larger or smaller quantity of acid, which may still annoy the workmen and injure the neighborhood, at the same time that it causes a loss to the manufacturer. I have succeeded in preventing these pernicious effects, by placing above the evaporating boiler G a movable condensing capital (chapiteau) H, suspended by cords *f f f*, passing over pulleys, in order to raise it to the proper height to permit the atmospheric air to circulate over the surface of the liquid, a condition necessary to promote rapid evaporation and to avoid the fusion of the lead of which the boiler is formed. This capital H, which is of the same size as the boiler G, is surrounded on its lower interior margin by a gutter, (designated by O, Fig. 2, in the new drawing,) into which flows the liquid which is condensed upon the whole interior surface of the capital, on which the vapors of the acid are thrown with an ascending force, which increases with the temperature, and which causes them to traverse the current of atmospheric air which circulates on the surface of the acid, contained in the boiler G, without spreading into the laboratory or its vicinity. If the capital should cover the boiler, closing it hermetically, (like the capital of an alembic) there would be danger of bursting the boiler and the evaporation would be almost nothing, or, at least, very slow, on account of the small aperture which the passage of a serpentine offers; for all the liquid, formed in the capital by condensation would fall back again into the boiler, an effect which does not take place with the gutter which receives the product of the condensation of my suspended capital.

Another important advantage of my invention, accelerating labor, is that my capital, being isolated in the air, receives none of the heat of the furnace, which it does not touch, so that the condensation is constantly effected as rapidly as the evaporation which cannot happen in a capital brought in contact with the boiler. As my leader capital is isolated in the air, the radiating heat and the heat of the vapor escape through the lead, (a good conductor) into the atmosphere.

When the sulfuric acid has attained the degree of concentration, up to 66° Baumé, to which it is desired to be brought, it is conducted into a reservoir, where it cools, and the boiler is filled again with the bleached and purified acid, contained in the upper boiler A, into which more acid is drawn off from the chambers, to continue without interruption the processes of purification and concentration.

To avoid the loss and emanations of gases which escape from the chambers of lead, I employ the apparatus described by Gay-Lussac, such as pipes containing sulfuric acid and reservoirs containing coke, together with the apparatus for absorption, containing alkaline solutions, agitated by the palettes of a revolving axis, invented by Mr. Sautter and described in the *Repertory of Patent Inventions*, London, August, 1843.

*Explanation of the drawing.*—A, leaden boiler, receiving the acid from the chambers of lead; B, leaden cover, suspended by the cords and pulleys (*f f f*) the edges of which enter the boiler and plunge into the acid; C, a small furnace, let into the masonry, for burning the sulfur and the production of the sulfurous gas; D, pipe conducting the sulfurous gas from the furnace C under the cover B; E, pipe conducting the gases which are not condensed from the cover B into the leaden chambers of the factory; F, brick furnace for the two boilers, having a single fire at K; G, leaden evaporating boiler, receiving the purified acid from the boiler A by the siphon M; H, leaden condensing capital, suspended by cords and pulleys *f f f* above the boiler G; I, pipe for the flowing of the liquid condensed in the gutter of the suspended capital H; J, receiver; M, siphon of communication between the two boilers A and G; N, solid carpentry which supports the pulleys by means of which the capitals can be raised to the proper degree of elevation for the purposes above described and for cleaning or necessary repairs.

My invention does not consist in the leaden boilers, used in manufactories to evaporate sulfuric acid to 60 degrees Baumé, nor in the siphon of communication between said boilers, nor in the brick furnace F, nor in the receiver J, but my invention consists in the apparatus composed of the movable covers or capitals, B and H, disposed in the manner I have described in my specification, so as to purify, bleach and concentrate sulfuric acid to every degree up to 66 degrees in the said leaden boilers.

In fine, what I claim as my invention and desire to secure by Letters Patent is—

1. The new and improved mode of bleaching and purifying (without loss or injurious emanations) sulfuric acid from the leaden chambers by means of the movable cover B, plunging into the liquid sulfuric acid contained in the boiler A and receiving, by the tube D, the sulfurous gas of the furnace C, leaving the surplus to escape by the tube E, as above described, which arrangement constitutes a new and complete apparatus, whereby is obtained by chemical reaction the bleaching and purification of the sulfuric acid as drawn from the leaden chambers, while it avoids the loss of the nitrous gas and the before stated inconveniences arising therefrom.

2. And I also claim as my invention the improved mode of concentrating sulfuric acid to sixty-six (66) degrees, without loss or injurious emanations, by means of the movable cover or capital H, surrounded by a gutter, adapted to the leaden evaporating boiler G, as above described.

D. E. COUTARET.

Witnesses:
EDMUND B. OTIS,
N. O. LOCKE.